United States Patent
Chen et al.

(10) Patent No.: US 9,226,278 B2
(45) Date of Patent: Dec. 29, 2015

(54) ENHANCED PHYSICAL DOWNLINK CONTROL CHANNEL (EPDCCH)

(75) Inventors: Xiaogang Chen, Beijing (CN); Yuan Zhu, Beijing (CN); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 322 days.

(21) Appl. No.: 13/598,320

(22) Filed: Aug. 29, 2012

(65) Prior Publication Data
US 2013/0242770 A1  Sep. 19, 2013

Related U.S. Application Data

(60) Provisional application No. 61/612,188, filed on Mar. 16, 2012.

(51) Int. Cl.
*H04W 72/04* (2009.01)
*H04W 72/08* (2009.01)
(Continued)

(52) U.S. Cl.
CPC ......... *H04W 72/0413* (2013.01); *H04L 1/1896* (2013.01); *H04L 5/0055* (2013.01);
(Continued)

(58) Field of Classification Search
CPC ....... H04L 5/0094; H04L 5/1438; H04L 5/14; H04W 72/042; H04W 24/00; H04W 72/04; H04W 52/0235; H04W 72/0406; H04W 72/082; H04W 52/02; H04W 72/1205; H04W 76/048; H04W 72/0413; H04W 52/0206; H04N 1/25841; H04N 21/41407; H04N 21/6405

USPC .................................................. 370/252, 329
See application file for complete search history.

(56) References Cited

U.S. PATENT DOCUMENTS 8,428,020 B2   4/2013  Cai et al.
2009/0322613 A1* 12/2009  Bala et al. ..................... 342/373
(Continued)

FOREIGN PATENT DOCUMENTS

EP  2200392 A1  6/2010
WO  2011/111961 A2  9/2011
(Continued)

OTHER PUBLICATIONS

R1-114239 ("DM-RS based Distributed and Localized E-PDCCH structure").*
(Continued)

*Primary Examiner* — Mark Rinehart
*Assistant Examiner* — Natali N Pascual Peguero
(74) *Attorney, Agent, or Firm* — Thorpe North & Western

(57) ABSTRACT

Technology for transmitting a distributed control channel element (CCE) for an enhanced physical downlink control channel (ePDCCH) and a localized CCE in a physical resource block (PRB) pair from a node and technology for physical downlink shared channel (PDSCH) physical resource block (PRB) allocation with at least one enhanced physical downlink control channel (ePDCCH) at a wireless device is disclosed. One method can include a node precoding at least one distributed CCE and at least one localized CCE for the PRB pair. The node can transmit the at least one distributed CCE for transmit diversity using at least two user equipment-specific reference signal (UERS) ports and transmitting the at least one localized CCE in the PRB pair. The at least two UERS ports can be used to transmit two CCEs.

21 Claims, 11 Drawing Sheets

(51) Int. Cl.

| | |
|---|---|
| H04W 52/02 | (2009.01) |
| H04L 5/14 | (2006.01) |
| H04W 72/12 | (2009.01) |
| H04W 76/04 | (2009.01) |
| H04W 24/00 | (2009.01) |
| H04W 24/02 | (2009.01) |
| H04N 21/258 | (2011.01) |
| H04N 21/414 | (2011.01) |
| H04N 21/6405 | (2011.01) |
| H04N 21/6408 | (2011.01) |
| H04W 4/06 | (2009.01) |
| H04L 5/00 | (2006.01) |
| H04L 12/18 | (2006.01) |
| H04L 29/06 | (2006.01) |
| H04W 28/02 | (2009.01) |
| H04L 1/18 | (2006.01) |
| H04W 52/14 | (2009.01) |

(52) U.S. Cl.
CPC .............. *H04L 5/14* (2013.01); *H04L 5/1438* (2013.01); *H04L 12/189* (2013.01); *H04L 65/601* (2013.01); *H04N 21/25841* (2013.01); *H04N 21/41407* (2013.01); *H04N 21/6405* (2013.01); *H04N 21/6408* (2013.01); *H04W 4/06* (2013.01); *H04W 24/00* (2013.01); *H04W 24/02* (2013.01); *H04W 28/0236* (2013.01); *H04W 28/0268* (2013.01); *H04W 28/0278* (2013.01); *H04W 52/02* (2013.01); *H04W 52/0206* (2013.01); *H04W 52/0209* (2013.01); *H04W 52/0235* (2013.01); *H04W 72/04* (2013.01); *H04W 72/042* (2013.01); *H04W 72/0406* (2013.01); *H04W 72/048* (2013.01); *H04W 72/082* (2013.01); *H04W 72/1205* (2013.01); *H04W 76/048* (2013.01); *H04W 52/0229* (2013.01); *H04W 52/143* (2013.01); *H04W 72/0446* (2013.01); *Y02B 60/50* (2013.01)

(56) References Cited

U.S. PATENT DOCUMENTS

| | | |
|---|---|---|
| 2011/0188462 A1 | 8/2011 | Yoo et al. |
| 2011/0299483 A1* | 12/2011 | Wu .............................. 370/329 |
| 2013/0003604 A1 | 1/2013 | Blankenship et al. |
| 2013/0039284 A1 | 2/2013 | Marinier et al. |
| 2013/0044693 A1 | 2/2013 | Lindh et al. |
| 2013/0077560 A1 | 3/2013 | Horiuchi et al. |
| 2013/0242947 A1 | 9/2013 | Chen et al. |

FOREIGN PATENT DOCUMENTS

| | | |
|---|---|---|
| WO | WO 2011111961 A2 * | 9/2011 |
| WO | 2013/138669 A1 | 9/2013 |
| WO | 2013/138674 A1 | 9/2013 |
| WO | WO 2013/153276 A1 | 10/2013 |

OTHER PUBLICATIONS

Ericsson, et al., "On reference signal design for enhanced control channels", R1-120076, 3GPP TSG-RAN WG1 #68, Dresden,Germany, Feb. 6-10, 2012, 5 pages.

LG Electronics, "Multiplexing PDSCH and E-PDCCH within a PRB pair", R1-120449, 3GPP TSG RAN WG1 Meeting #68, Dresden, Germany, Feb. 6-10, 2012, 4 pages.

Panasonic, "Multiplexing between ePDCCH and PDSCH", R1-120235, 3GPP TSG RAN WG1 Meeting #68, Dresden, Germany, Feb. 6-10, 2012, 4 pages.

Panasonic, "Multiplexing of ePDCCHs and ePDCCH RE mapping", R1-120237, 3GPP TSG RAN WG1 Meeting #68, Dresden, Germany, Feb. 6-10, 2012, 5 pages.

Panasonic, "Search space design for enhanced PDCCH", R1-120236, 3GPP TSG RAN WG1 Meeting #68, Dresden, Germany, Feb. 6-10, 2012, 5 pages.

International Search Report and Written Opinion received for PCT Patent Application No. PCT/US2013/031762, mailed on Jun. 28, 2013, 15 pages.

International Search Report and Written Opinion received for PCT Patent Application No. PCT/US2013/031796, mailed on Jun. 28, 2013, 13 pages.

Research in Motion, UK Limited, "Multiplexing of Different DCI Messages", RI-120331, 3GPP TSG RAN WGI Meeting #68, Dresden, Germany, Feb. 6-10, 2012, 6 Pages.

3GPP TS 36.213 V10.4.0 (201112); 3rd Generation Partnership Project; Technical Specification Group Radio Access Network; Evolved Universal Terrestrial Radio Access (E-UTRA); Physical layer procedures (release 10). 125 pages.

Office Action received for U.S. Appl. No. 13/646,223 dated Jul. 14, 2015, 22 pages.

Intel Corporation, "On Downlink Control Signalling Enhancement", 3GPP TSG RAN WG1 R1-112219, Discussion and Decision, Aug. 2011, Meeting 66, Agenda 6.6.2.2, Athens, Greece.

LGE, "Correction of Semi-Persistent Scheduled Data Transmission De-Activation", 3GPP TSG-RAN1 R1-090198, Draft Change Request, Jan. 2008, Meeting 55bis, Version 8.5.0, CR 36.213, Ljubljana, Slovenia.

Interdigital Communications LLC, "Reference Signals for ePDCCH" 3GPP TSG RAN WG1 R1-120138, Discussion/Decision, Feb. 2012, Meeting 68, Agenda 7.6.1, Dresden, Germany.

MCC 160 et al, "GCF P3: Corrections to DL and UL SPS Grant Test Cases", 3GPP TSG-RAN WG5 R5-1100504, Change Request, Feb. 2011, Meeting 50, Version 9.3.0, CR 36.523-1, Taipei Taiwan.

Search Report for European application 13761107.5 dated Oct. 8th, 2015, 8 pages.

Search Report for European application 13761288 dated Oct. 23, 2015, 9 pages.

Panasonic et al, "Size Adjustment of DCI Format 0, 1A and 1", 3GPP TSG-RAN WG1 R1-112802, Change Request, Aug. 2011, Meeting 66, Version 10.2.0, CR 36.212, Rev 1, Athens, Greece.

* cited by examiner

ENHANCED PHYSICAL DOWNLINK CONTROL CHANNEL (EPDCCH)

RELATED APPLICATIONS

This application claims the benefit of and hereby incorporates by reference U.S. Provisional Patent Application Ser. No. 61/612,188, filed Mar. 16, 2012.

BACKGROUND

Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNode B to the UE via a physical downlink shared channel (PDSCH). A physical downlink control channel (PDCCH) can be used to transfer downlink control information (DCI) that informs the UE about resource allocations or scheduling related to downlink resource assignments on the PDSCH, uplink resource grants, and uplink power control commands. The PDCCH can be transmitted prior the PDSCH in each subframe transmitted from the eNode B to the UE.

The PDCCH signal can be designed to be demodulated at the UE based on a cell specific reference signal (CRS). However, the use of a CRS does not take into account the increased complexities of advanced LTE systems. For instance, in heterogeneous networks, multiple nodes can simultaneously transmit within a single cell. The use of the cell specific reference signal can limit advanced techniques to increase cell capacity.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
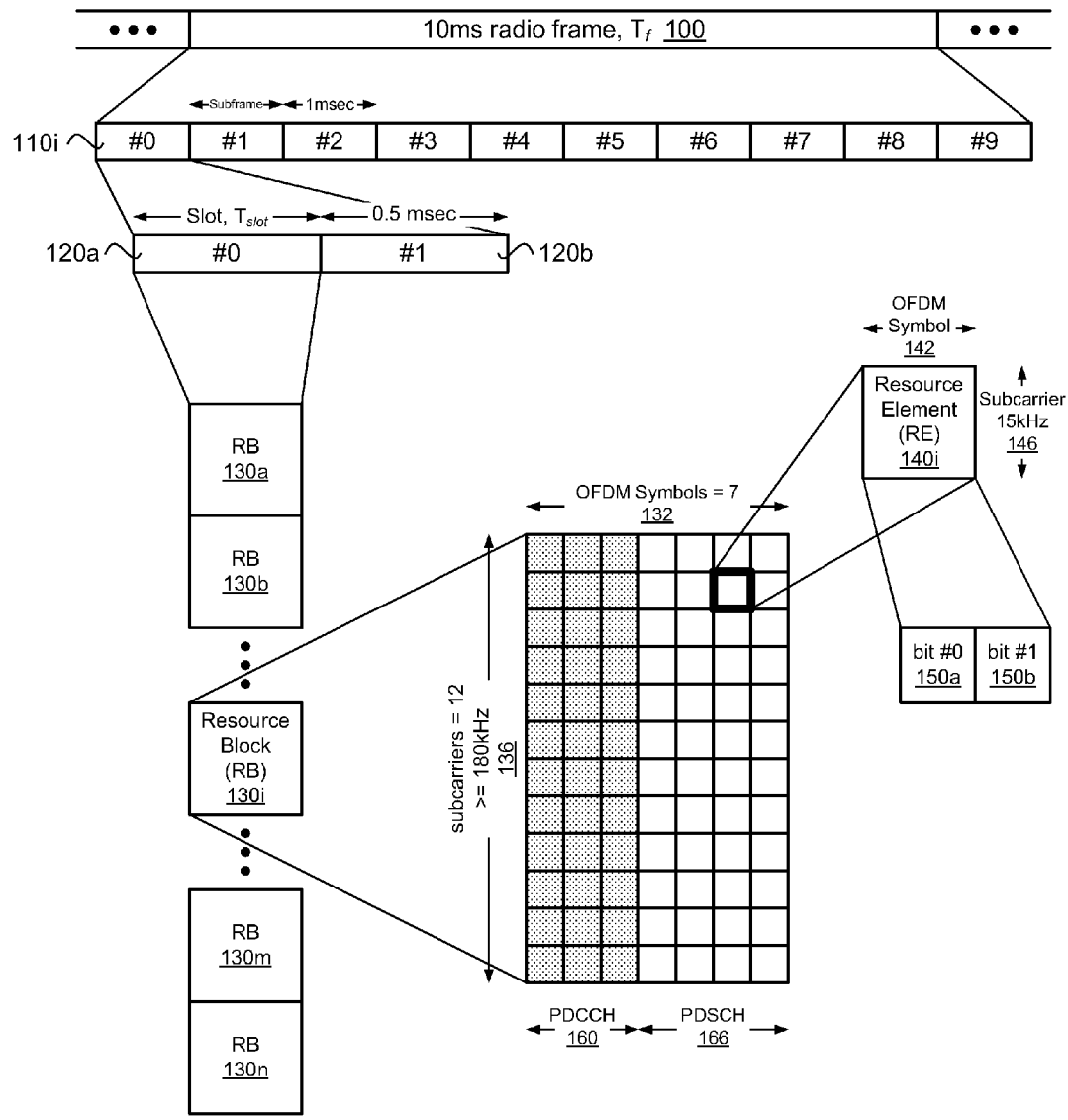
FIG. 1 illustrates a block diagram of radio frame resources (e.g., a resource grid) including a legacy physical downlink control channel (PDCCH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

The communication of data on the physical downlink shared channel (PDSCH) can be controlled via a control channel, referred to as a physical downlink control channel (PDCCH). The PDCCH can be used for downlink (DL) and uplink (UL) resource assignments, transmit power commands, and paging indicators. The PDSCH scheduling grant can be designated to a particular wireless device (e.g., UE) for dedicated PDSCH resource allocation to carry UE-specific traffic, or it can be designated to all wireless devices in the cell for common PDSCH resource allocation to carry broadcast control information such as system information or paging.

In one example, the PDCCH and PDSCH can represent elements of a radio frame structure transmitted on the physical (PHY) layer in a downlink transmission between a node (e.g., eNodeB) and the wireless device (e.g., UE) using a generic 3GPP long term evolution (LTE) frame structure, as illustrated in FIG. 1.

FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into two slots 120a and 120b, each with a duration, $T_{slot}$, of 0.5 ms. The first slot (#0) 120a can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

Each RB (physical RB or PRB) 130i can include 12-15 kHz subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 2:
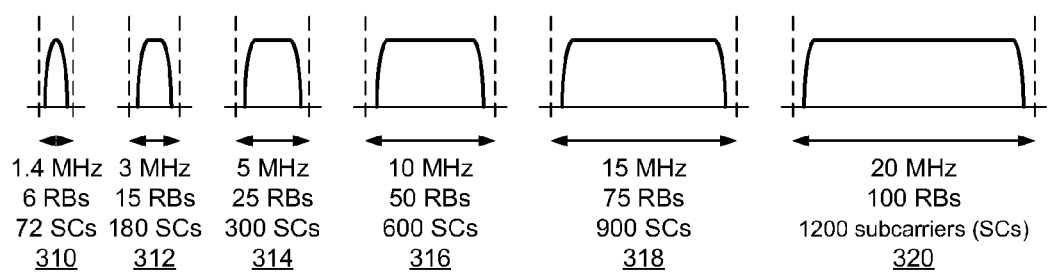
FIG. 2 illustrates a block diagram of various component carrier (CC) bandwidths in accordance with an example.

Each wireless device may use at least one bandwidth. The bandwidth may be referred to as a signal bandwidth, carrier bandwidth, or component carrier (CC) bandwidth, as illustrated in FIG. 2. For example, the LTE CC bandwidths can include: 1.4 MHz 310, 3 MHz 312, 5 MHz 314, 10 MHz 316, 15 MHz 318, and 20 MHz 320. The 1.4 MHz CC can include 6 RBs comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

The data carried on the PDCCH can be referred to as downlink control information (DCI). Multiple wireless devices can be scheduled in one subframe of a radio frame. Therefore, multiple DCI messages can be sent using multiple PDCCHs. The DCI information in a PDCCH can be transmitted using one or more control channel elements (CCE). A CCE can be comprised of a group of resource element groups (REGs). A legacy CCE can include up to nine REGs. Each REG can be comprised of four resource elements (REs). Each resource element can include two bits of information when quadrature modulation is used. Therefore, a legacy CCE can include up to 72 bits of information. When more than 72 bits of information are needed to convey the DCI message, multiple CCEs can be employed. The use of multiple CCEs can be referred to as an aggregation level. In one example, the aggregation levels can be defined as 1, 2, 4 or 8 consecutive CCEs allocated to one PDCCH.

The legacy PDCCH can create limitations to advances made in other areas of wireless communication. For example, mapping of CCEs to subframes in OFDM symbols is typically spread over the control region to provide spatial diversity. However, no beam forming diversity may be possible with the current mapping procedures.

Moreover, the capacity of the legacy PDCCH may not be sufficient for advanced control signaling. For instance, networks may be configured as heterogeneous networks (HetNets) that can include a number of different kinds of nodes in a single macro cell serving area. More wireless devices can be served simultaneously by macro and pico cells in the HetNet. The PDCCH can be designed to demodulate based on cell-specific reference signals (CRS), which can make fully exploring cell splitting gain difficult. The legacy PDCCH may not be adequate to convey the information needed to allow a wireless device to take advantage of the multiple transmission nodes in the HetNet to increase bandwidth and decrease battery usage at the wireless device.

In addition, an increased capacity in the PDCCH can be useful in the use of multi-user multiple-input multiple-output (MU-MIMO), machine to machine communication (M2M), PDSCH transmission in a multicast\broadcast single-frequency network, and cross carrier scheduling. The use of UE specific reference signals (UERS) in PDCCH demodulation at the wireless device can allow the use of multiple nodes in the HetNet. Rather than relying on a single common reference symbol (e.g., CRS) for an entire cell, each reference symbol can be UE specific (e.g., UERS).

To overcome the limitations of the legacy PDCCH, an enhanced PDCCH (ePDCCH) can use the REs in an entire PRB or PRB pair (where a PRB pair is two contiguous PRBs using the same subcarrier's subframe), instead of just the first one to three columns of OFDM symbols in a first slot PRB in a subframe as in the legacy PDCCH. Accordingly, the ePDCCH can be configured with increased capacity to allow advances in the design of cellular networks and to minimize currently known challenges and limitations.

Unlike the legacy PDCCH, the ePDCCH can be mapped to the same REs or region in a PRB as the PDSCH, but in different PRBs. In an example, the PDSCH and the ePDCCH may not be multiplexed within a same PRB (or a same PRB pair). Thus if one PRB (or one PRB pair) contains an ePD- CCH, the unused REs in the PRB (or PRB pair) may be blanked, since the REs may not be used for the PDSCH.

Figure 3:
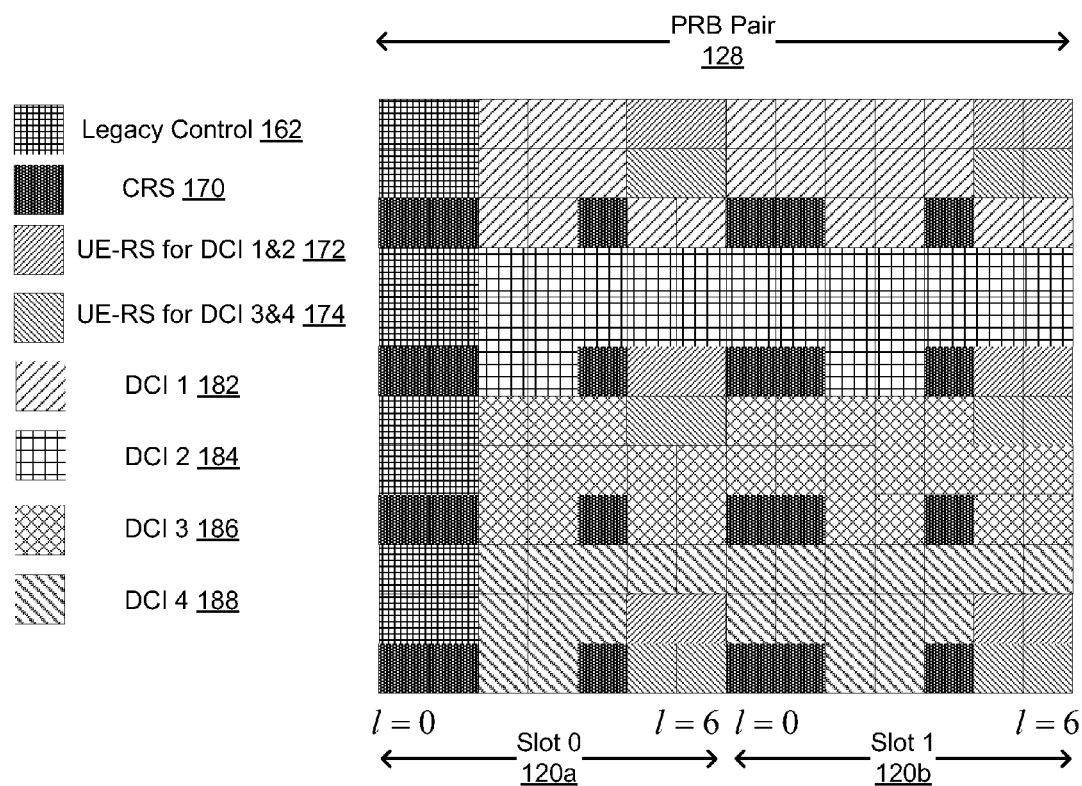
FIG. 3 illustrates a block diagram of multiplexing four localized aggregation level one control channel elements (CCE) associated with downlink control information (DCI) into one physical resource block (PRB) pair in accordance with an example.

FIG. 3 illustrates 4 DCIs 182, 184, 186, and 188 of an ePDCCH in a PRB pair 128. Each DCI of the ePDCCH can be transmitted by at least one CCE, and each CCE can include a plurality of REGs, and each REG can include a plurality of REs. FIG. 3 illustrates a multiplexing pattern of an ePDCCH when multiple aggregation level one (AGL1) localized CCEs are multiplexed in one PRB pair. An aggregation level one CCE (e.g., a single CCE) can include a DCI, so four CCEs can include four separate DCIs. In another example (not shown), an aggregation level two CCE (e.g., two CCEs) can include one DCI. The PRB pair can also include legacy control 162 (e.g., legacy PDCCH) and reference signals, such as cell-specific reference signals (CRS) 170 and UE specific reference signals (UERS) 172 and 174, used for demodulation and channel estimation. In an example, DCI 1 and DCI 2 can use UERS 172, which can be different from the UERS 174 used by DCI 3 and DCI 4.

Figure 4:
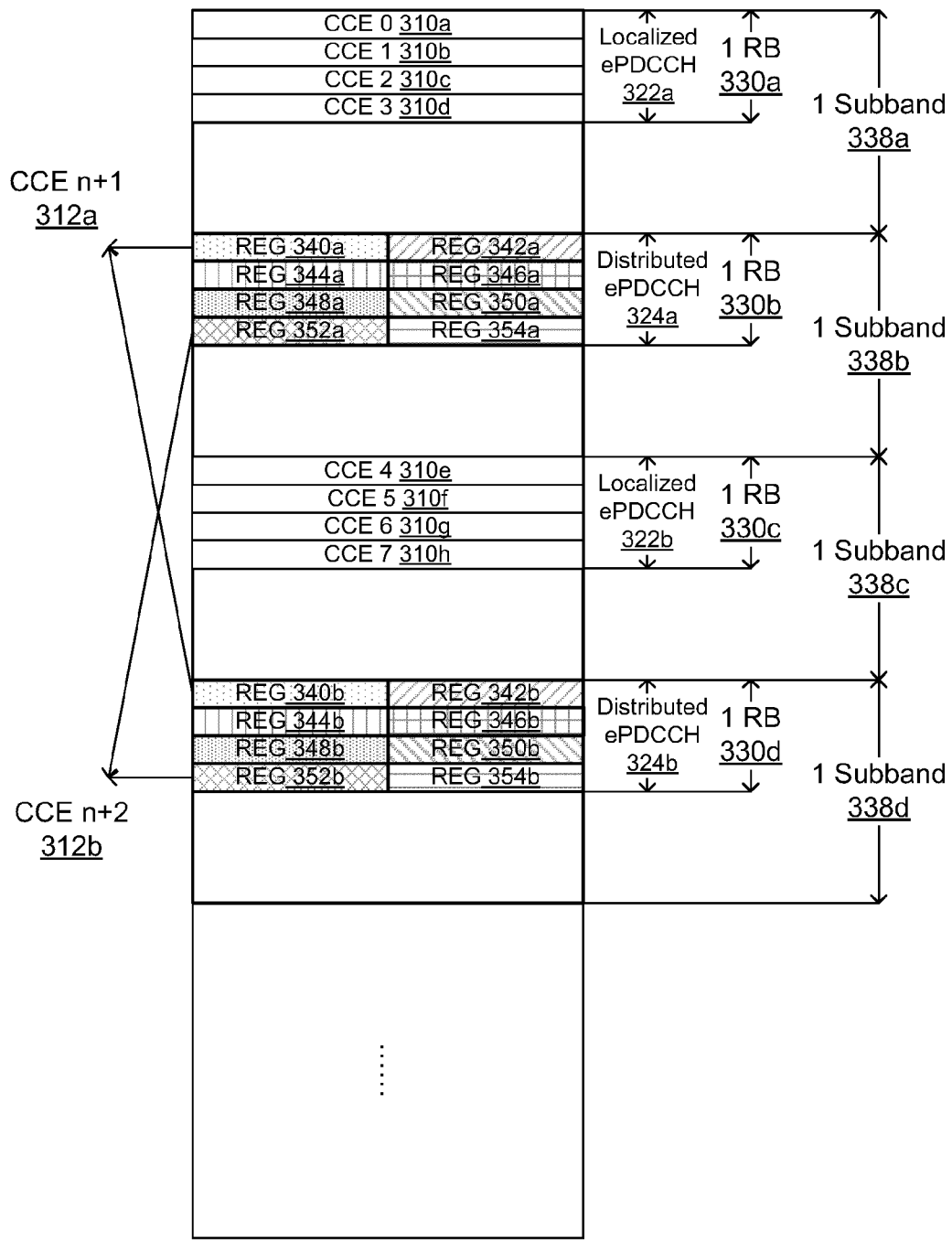
FIG. 4 illustrates a block diagram of control channel elements (CCE) and resource element groups (REG) mapped to a subframe using localized enhanced physical downlink control channels (ePDCCH) and distributed ePDCCH in accordance with an example.
Figure 5:
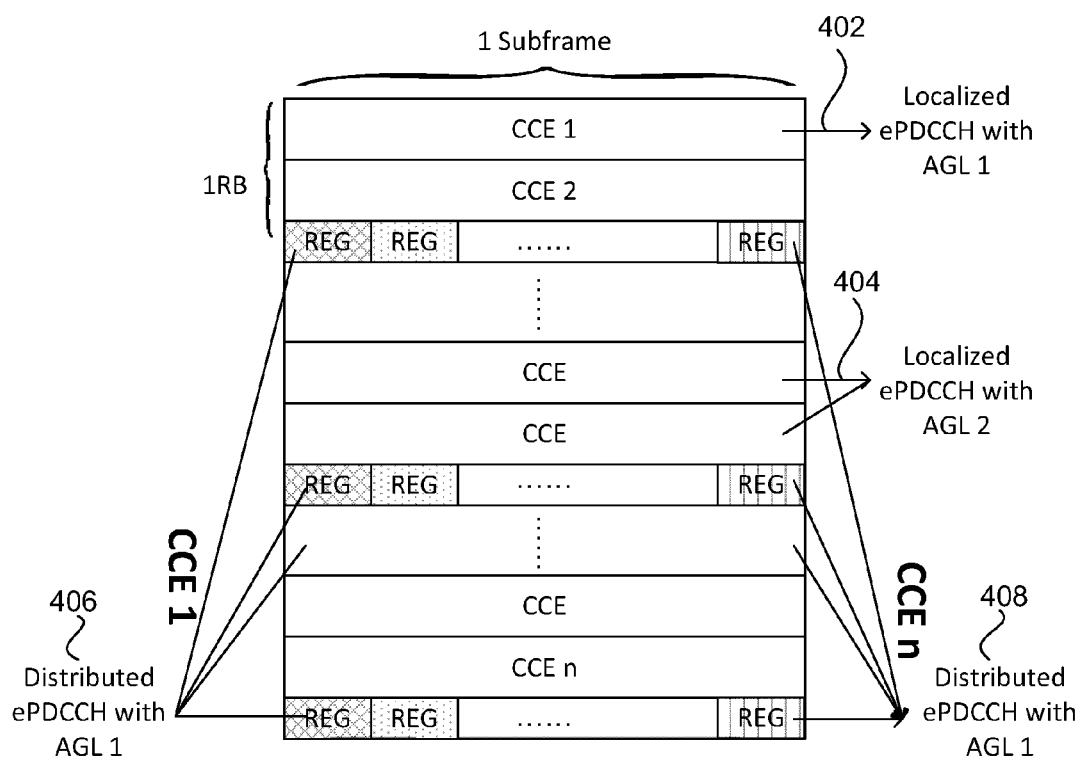
FIG. 5 illustrates a block diagram of an enhanced physical downlink control channel (ePDCCH) mapped to a subframe using localized ePDCCH and distributed ePDCCH in accordance with an example.

The PRB or PRB pair can be used to support both localized ePDCCH and distributed ePDCCH transmissions. FIGS. 4 and 5 illustrate localized ePDCCH and distributed ePDCCH in a slot or a subframe. In a localized ePDCCH 332a-b, the entire CCE 310a-h may be within a PRB 330a and 330c (or PRB pair) within a subband 338a and 338c, as illustrated in FIG. 4. In an example, the REGs (or REs) of the localized CCE can be contiguous to each other, which may be followed by a subsequent CCE. In a distributed ePDCCH 324a-b, the REGs 340a-b, 342a-b, 344a-b, 346a-b, 348a-b, 350a-b, 352a-b, and 354a-b of the CCE 312a-b can be distributed over multiple PRBs 330b and 330d (or PRB pairs). The REG (s) 340a in one PRB 330b and the REG(s) 340b in another PRB 330d can form the CCE 312a for the DCI or the distributed ePDCCH. In distributed ePDCCH, the REGs for a CCE can be distributed over two or more PRBs (or two or more PRB pairs). In an example, the REGs of the CCEs used in the distributed ePDCCH can be distributed over different subbands 338b and 338d.

FIG. 5 provides another example of a localized ePDCCH and a distributed ePDCCH mapped into CCEs, REGs, and REs within a subframe. In the example of FIG. 5, each resource block pair can comprise two resource blocks (RB or PRB), each having the same subcarriers, located in a first and second slot in the subframe of a radio frame, as shown in FIG. 1. Each RB can include at least one CCE. The CCE may be in a defined location within the RB. However, the CCE may include REGs that are located throughout the resource block. Each REG may include four REs. However, based on system requirements, a REG may include more or less REs. In an example, the REs located in a REG can be contiguous in at least one of frequency and time. In another example, the REs located in a REG may be separated in time and/or frequency. The number of REGs in a CCE may be a fixed number, such as nine. Alternatively, the number of REGs may vary based on DCI data load requirements (i.e., the amount of DCI data), or other competing requirements in the RB, such as physical control format indicator channel (PCFICH) requirements, physical hybrid-ARQ indicator channel (PHICH) requirements, and resource symbol requirements for data allocated within each resource block. The CCE may be mapped across a slot boundary in the physical resource block pair.

A localized ePDCCH 402 having aggregation level (AGL) one can be mapped to a single CCE, which can be mapped to a single RB, as shown in FIG. 5. Similarly, a localized ePDCCH 404 with an aggregation level of two may be mapped to two contiguous CCEs in a RB. For a distributed ePDCCH 406 and 408, the CCE(s) (e.g. CCE 1 and CCE N) can mapped to a plurality of REGs in different RBs in different frequency carriers and subcarriers. For example, the REGs for the CCE N can be distributed in frequency. The frequency separation of the REGs can provide a frequency diversity gain. In an example, each REG in a CCE may be mapped to a separate RB, although more than one REG may be mapped to a same RB as another REG. A greater frequency diversity gain that can occur with widely distributed the REGs. The REGs in CCE 1 and CCE N may have the same distribution (shown) or different distribution (not shown) amongst RBs in a subframe. While the REGs illustrated in the distributed ePDCCH 406 and 408 are each shown to be in the same time position within a RB, for each respective CCE, a same time position within a RB for the distributed ePDCCH is not required. The distributed REGs in CCE 1 and CCE N may be in a different temporal location within a resource block. Each CCE in a subframe may have a same number of REGs or a different number of REGs. The distributed ePDCCH can have an aggregation level of one. The aggregation level of one implies that the DCI information can be mapped to a single CCE.

The distribution of the REGs in a CCE over frequency to different resource blocks in a subframe can provide an increase in frequency diversity gain. FIG. 5 illustrates a distributed ePDCCH 406 and 408 transmission.

In another example, when the ePDCCH has an aggregation level greater than one (e.g., aggregation level 2, 4, or 8) the CCE can include localized CCE or distributed CCEs. A localized CCE can be CCEs (for an ePDCCH with an aggregation level greater than one) that are contiguous to each other, which may be followed by a subsequent CCE in time or frequency. A distributed CCE can be CCEs (for an ePDCCH with an aggregation level greater than one) that are non-contiguous or CCEs distributed over multiple PRBs (or PRB pairs).

In another configuration, the localized ePDCCH and distributed ePDCCH can be multiplexed in one PRB pair in one subframe. Referring back to FIG. 3, different DCIs can be frequency division multiplexed (FDM) in a same PRB pair across two slots of a subframe. In an example, antenna ports 7, 8, 9, and/or 10 can be used in one PRB pair. In another example, one PRB pair can be divided into four CCEs to carry four DCIs with AGL1, as shown in FIG. 3. Each UERS port can be associated with one CCE for demodulation and/or channel estimation. In an example, two CCEs (e.g., DCIs) can share two UERS antenna ports 172 and 174.

CCE level frequency domain multiplexing can be used between localized CCEs and distributed CCEs, as previously illustrated in FIG. 5. The localized ePDCCH and distributed ePDCCH can use different transmission modes. For example, the localized ePDCCH can use beamforming and the distributed ePDCCH can use transmit diversity. Since at least two UERS ports may be needed for transmit diversity, different transmission schemes may be used when a different number of distributed CCEs are used in one PRB pair.

For example, when one CCE is reserved for distributed ePDCCH transmission (e.g., Tx diversity) in one PRB pair, the other CCEs can be reserved for localized ePDCCH transmission. To illustrate the concept further, beamforming can applied on three UERS ports (e.g. UERS ports 7-9) for localized transmission and only one UERS port (e.g. UERS port 10) may be available for transmit diversity transmission. Since at least two UERS ports may be needed for transmit diversity, a wireless device can estimate a downlink channel by monitoring UERS port 10 and another UERS port $x \in \{7, 8, 9\}$ used for localized transmission. A precoding vector w can be used by antenna port x. To provide minimal interference from the localized ePDCCH transmission, the precoding vector applied to UERS port 10 (for the distributed ePDCCH transmission) can be orthogonal to the precoding vector w. The precoding vector for the one UERS port (e.g. UERS port 10) used for the distributed ePDCCH transmission can be represented by orth(w) where orth(w) is a precoding vector that is orthogonal to w. In an example, the precoding vectors w and orth(w) can be included in a codebook for spatial multiplexing (e.g., beamforming) and correspond to a feedback report, such as a precoding matrix indicator (PMI), a rank indicator (RI), or a channel quality indicator (CQI).

Using FIG. 3 as an illustration, DCI 1 182 can be transmitted in a distributed ePDCCH, and DCI 2 184, DCI 3 186, and DCI 4 188 can be transmitted in localized ePDCCHs. The CCE of DCI 2 can be precoded with precoding vector w, and DCI 1 can be precoded with precoding vector orth(w).

In another example where two or more CCEs are used for distributed ePDCCH transmission in one PRB pair, any two UERS ports (e.g., UERS ports 7, 8, 9 and/or 10) associated with the CCEs used for distributed ePDCCH transmission can be used for transmit (Tx) diversity. The remaining CCEs in the PRB pair used for localized ePDCCH transmission can be transmitted using beamforming.

Using FIG. 3 as an illustration, DCI 1 182 and DCI 2 184 can be transmitted in a distributed ePDCCH where UERS ports 7 and 8 are associated with DCIs 1 and 2, and DCI 3 186 and DCI 4 188 can be transmitted in localized ePDCCHs where UERS ports 9 and 10 are associated with DCIs 3 and 4. If three CCEs are used for distributed ePDCCH transmission in one PRB pair, one CCE can be used for localized ePDCCH transmission. For example, DCI 1 182, DCI 2 184, and DCI 3 186 can be transmitted in a distributed ePDCCH where UERS ports 7, 8, and 9 are associated with DCIs 1, 2, and 3, and DCI 4 188 can be transmitted in localized ePDCCHs where UERS port 10 is associated with DCI 4. The distributed ePDCCH(s) and localized ePDCCH(s) can use any UERS port number.

Transmit diversity can include the use of two or more physically separate transmit antennas for signal transmission. Transmit diversity can be a type of antenna diversity, also known as space diversity, which two or more antennas can be used to improve the quality and reliability of a wireless link. Often, especially in urban and indoor environments, no clear line-of-sight (LOS) between transmitter and receiver may exist. Instead the signal may be reflected along multiple paths before finally being received. Each of bounce of the signal reflection can introduce phase shifts, time delays, attenuations, and/or distortions that can destructively interfere with one another at an aperture of the receiving antenna. Antenna diversity or transmit diversity can be effective at mitigating multipath interference.

Beamforming (also referred to as spatial multiplexing or spatial filtering) can be a signal processing technique used in antenna arrays for directional signal transmission or reception. Beamforming can be achieved by combining elements in the array in such a way that signals at particular angles experience constructive interference while others experience destructive interference. Beamforming can be used in transmission (or reception) to achieve spatial selectivity. Beamforming can improve an array gain, which can be a concentration of energy in one or more given directions via precoding. Beamforming can allow multiple users located in different directions to be served simultaneously (e.g., multi-user MIMO). In LTE, UERS can be used enable a wireless device to demodulate beamformed data coherently. For example, an eNodeB may use a correlated array of physical antenna elements to generate a narrow beam in the direction of a particular UE. Such a beam can experience a different channel response between the eNodeB and UE, thus UE-specific RSs (UERS) can be used to enable the UE to demodulate the beamformed data coherently. For closed-loop beamforming, a wireless device can provide feedback based on the received channel including the UERS. The feedback can include a precoding matrix indicator (PMI), a rank indicator (RI), or a channel quality indicator (CQI). Open-loop beamforming can have limited feedback relative to closed-loop beamforming.

The use of ePDCCH can also modify PDCCH validation for semi-persistent scheduling (SPS). SPS enables radio resources to be semi-statically configured and allocated to a wireless device for a longer time period than one subframe, avoiding the need for specific downlink assignment messages or uplink grant messages over the PDCCH for each subframe. SPS can be useful for services such as voice over internet protocol (VoIP) for which the data packets are small, periodic and semi-static in size. For services like VoIP, the timing and amount of radio resources needed for transmissions can be predictable. Thus, the overhead of the PDCCH (e.g., ePDCCH) can significantly reduced compared to dynamic scheduling. SPS can be configured by upper layer signaling, such as radio resource control (RRC) signaling, which can indicate the interval at which the radio resources are periodically assigned.

A semi-persistent scheduling (SPS) cell-radio network temporary identifier (C-RNTI) can be used in SPS. The SPS C-RNTI of the scheduling messages can be transmitted on the PDCCH for semi-persistently scheduled PDSCH data transmissions. The SPS C-RNTI allows the wireless device (e.g., UE) to differentiate SPS messages from dynamic scheduling messages identified by a C-RNTI. The identifier (i.e. SPS C-RNTI) can be transmitted as a scrambling code applied to the cyclic redundancy check (CRC) of the PDCCH transmission. Dynamic scheduling can provide downlink assignment messages for an allocation of downlink transmission resources and uplink grant messages for the allocation of uplink transmission resources, which can be valid for specific single subframes. Dynamic scheduling can be efficient for bursty and dynamic rate traffic, such as transmission control protocol (TCP) and signaling radio bearer (SRB) service types.

Cyclic redundancy check (CRC) can be an error detecting code appended to a block of data to be transmitted. The value of the CRC can be calculated from the block of data. The length of the CRC can determine the number of errors which can be detected in the block of data on reception of the data. A CRC may not be able to correct errors or determine which bits are erroneous.

Because an activation of SPS can take longer than dynamic scheduling, the CRC (e.g., virtual CRC) used in SPS can generate CRC false positives, which can much more harmful than dynamic scheduling. So as a result, additional PDCCH validation procedures can be used for SPS C-RNTI masked scheduling. A false positive error can be a result that indicates a given condition has been fulfilled, when the condition actually has not been fulfilled. For example, a false positive can occur when the CRC should generate an error, but does not generate an error.

Figure 6:
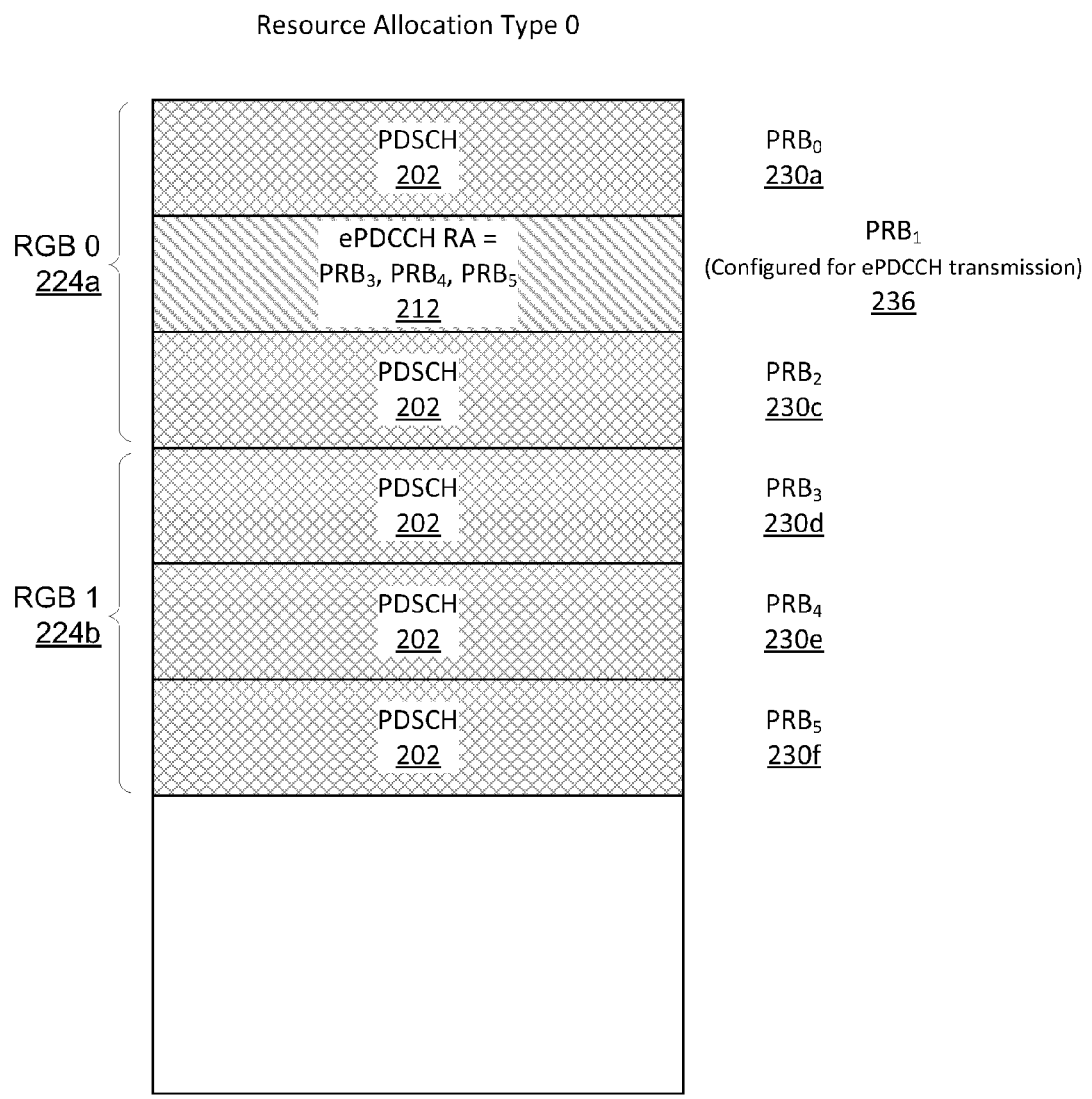
FIG. 6 illustrates a block diagram of resource block assignment using a resource allocation type 0 with an enhanced physical downlink control channel (ePDCCH) physical resource block (PRB) and physical downlink shared channel (PDSCH) PRBs in accordance with an example.
Figure 7:
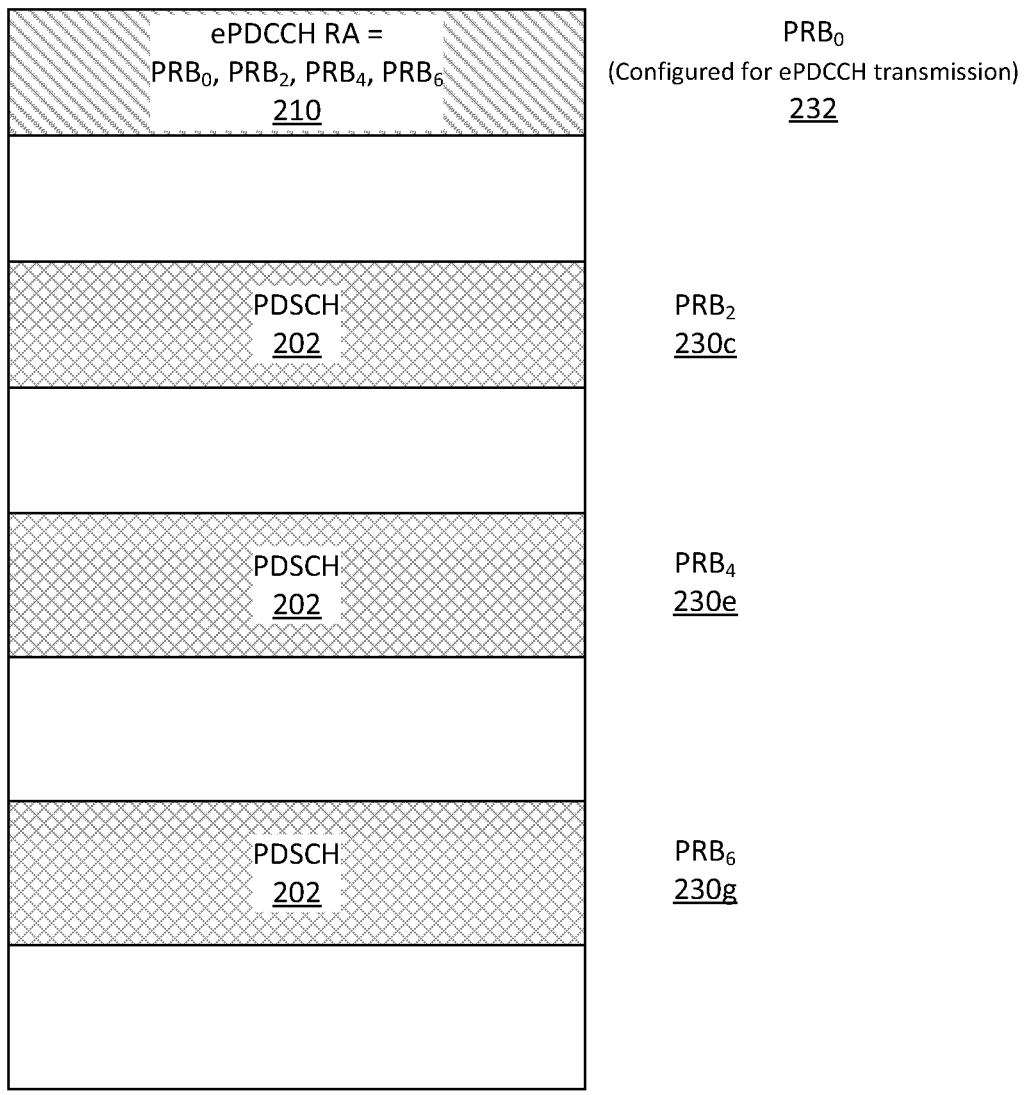
FIG. 7 illustrates a block diagram of resource block assignment using a resource allocation type 1 with an enhanced physical downlink control channel (ePDCCH) physical resource block (PRB) and physical downlink shared channel (PDSCH) PRBs in accordance with an example.

Various differences exist between the ePDCCH and the legacy PDCCH. One difference between ePDCCH and the legacy PDCCH is that ePDCCH can be FDM with the PDSCH with a PRB granularity (as illustrated in FIG. 6-7), but the legacy PDCCH 160 can be time division multiplexed (TDM) with PDSCH 166 with OFDM symbol granularity (as illustrated in FIG. 1). The difference between the ePDCCH and the legacy PDCCH can be utilized to create additional PDCCH validation for SPS C-RNTI masked scheduling.

A wireless device can determine the PRB pairs configured for ePDCCH before receiving ePDCCH transmitted DCIs. In an example, the wireless device can determine the PRB pairs configured for ePDCCH via high layer signaling, such as RRC signaling. In an example, the ePDCCH and the PDSCH can be frequency division multiplexed (FDM) at a PRB pair level. FIG. 3 illustrates different DCIs FDM in one PRB pair. In another example, the PDSCH and the ePDCCH may not be multiplexed within a same PRB (or a same PRB pair), so ePDCCH and PDSCH may not exist in a same PRB pair.

Resource allocation signaling in the DCI can indicate which PRBs are allocated to PDSCH. If ePDCCH PRBs are not allowed for PDSCH transmission, the wireless device can detect an incorrect DCI if the resource allocation signaling still indicates ePDCCH PRB for a PDSCH transmission. In legacy PDCCH, since the granularity is OFDM symbol based instead of PRB based, and resource allocation is based on PRB, a check of the DCI may not be need for the legacy PDCCH.

In an example, the PDCCH validation for SPS C-RNTI masked scheduling can include the wireless device performing an additional validation for ePDCCH carried DCIs. For example, if a DCI uses resource allocation (RA) type 0 resource block group (RBG) based scheduling and if the PDSCH allocation contains one RBG which includes (or overlaps with) a PRB where the ePDCCH is transmitted, the wireless device can exclude (or deduct) at least one ePDCCH PRB from the PDSCH PRB resource allocation. In one option, the wireless device can exclude the ePDCCH PRBs (e.g., ePDCCH PRB pairs) for the wireless device from a PDSCH PRB allocation. In another option, the wireless device can exclude all the ePDCCH PRBs (e.g., ePDCCH PRB pairs for all wireless devices) in a same subframe from a PDSCH PRB allocation. In other words, the wireless device can exclude all PRB pairs configured for ePDCCH in the same subframe where ePDCCH is transmitted.

In resource allocations of type 0, a bitmap can indicates the resource block groups (RBGs) which can be allocated to a scheduled wireless device, where an RBG can be a set of consecutive PRBs in frequency. The RBG size P can be a function of the downlink system bandwidth $N_{RB}^{DL}$. The RBG size P can be the number of PRBs within a RBG. In an example, the total number of RBGs $N_{RBG}$ for downlink system bandwidth of $N_{RB}^{DL}$ is given by $N_{RBG}=\lceil N_{RB}^{DL}/P \rceil$. For a downlink system bandwidth of 10 PRBs or less (e.g., 1.4 MHz) the RBG size P can be one PRB per RBG. For a downlink system bandwidth of 11-26 PRBs (e.g., 3 or 5 MHz) the RBG size P can be two PRBs per RBG. For a downlink system bandwidth of 27-63 PRBs (e.g., 10 MHz) the RBG size P can be three PRBs per group. For a downlink system bandwidth of 64-110 PRBs (e.g., 15 or 20 MHz) the RBG size P can be four PRBs per RBG.

FIG. 6 illustrates a subframe (or slot) where a RA type 0 is used with a downlink system bandwidth of 10 MHz (e.g., 50 PRBs; see 316 of FIG. 2). The subframe can include RBGs 224a-b with a plurality PRBs 230a-f and 236. A RB group (RBG) can include multiple RBs that contain ePDCCH PRBs. The subframe frame can be configured for PDSCH 202 PRBs 230a,c-f and ePDCCH 212 PRBs 236. The wireless device can exclude the ePDCCH 212 from the PDSCH resource allocation when the ePDCCH PRB is for the wireless device or the wireless device can exclude the ePDCCH 212 from the PDSCH resource allocation for all ePDCCH PRBs within the subframe.

In another example, if a DCI uses RA type 1 PRB based scheduling and if the PDSCH allocation contains one PRB which includes (or overlaps with) a PRB where the ePDCCH is transmitted, the wireless device can exclude (or deduct) at least one ePDCCH PRB from the PDSCH PRB resource allocation. In one option, the wireless device can exclude the ePDCCH PRBs (e.g., ePDCCH PRB pairs) for the wireless device from a PDSCH PRB allocation. In another option, the wireless device can exclude all the ePDCCH PRBs (e.g., ePDCCH PRB pairs for all wireless devices) in a same subframe from a PDSCH PRB allocation.

In resource allocations of type 1, individual PRBs can be addressed within a subset of the PRBs available. The bitmap used for RA type 1 can be slightly smaller than for RA type 0, since some bits can be used to indicate which subset of the RBG is addressed, and a shift in the position of the bitmap. The total number of bits (including additional flags used for the indications described) can be similar to the bit used for RA type 0. RA type 1 can provide flexibility in spreading resources across the frequency domain to exploit frequency diversity.

FIG. 7 illustrates a subframe (or slot) where a RA type 1 is used with a downlink system bandwidth of 15 or 20 MHz (e.g., 75 or 100 PRBs; see 318 or 320 of FIG. 2), where a virtual RBs (VRBs) are from one of P RBG subsets. The subframe can include a plurality PRBs 230c,e,g and 232. The subframe frame can be configured for PDSCH 202 PRBs 230c,e,g and ePDCCH 210 PRBs 236. The wireless device can exclude the ePDCCH 210 from the PDSCH resource allocation when the ePDCCH PRB is for the wireless device or the wireless device can exclude the ePDCCH 210 from the PDSCH resource allocation for all ePDCCH PRBs within the subframe.

Similar to RA type 0 and RA type 1, if a DCI uses RA type 2 contiguous PRB based scheduling and if the PDSCH allocation contains one or more PRB which includes (or overlaps with) PRBs where the ePDCCH is transmitted, the wireless device can exclude (or deduct) at least one ePDCCH PRB from the PDSCH PRB resource allocation. In one option, the wireless device can exclude the ePDCCH PRBs (e.g., ePDCCH PRB pairs) for the wireless device from a PDSCH PRB allocation. In another option, the wireless device can exclude all the ePDCCH PRBs (e.g., ePDCCH PRB pairs for all wireless devices) in a same subframe from a PDSCH PRB allocation.

In resource allocations of type 2, the resource allocation information indicates a contiguous set of PRBs, using either localized or distributed mapping as indicated by a 1-bit flag in the resource allocation message. PRB allocations may vary from a single PRB up to a maximum number of PRBs spanning the downlink system bandwidth.

In another example, a specification, such as the LTE specification can restrict that an ePDCCH PRB may not be used for PDSCH transmission or used in a PDSCH allocation, which can allow for an additional validation because the wireless device can verify if ePDCCH PRB is included in resource allocation signaling in DCI.

In another configuration, when RA type 0, RA type 1, and RA 2 is used, a wireless device can restrict an ePDCCH PRB being used in the RA. In an example, an ePDCCH PRB for the wireless device may not be in the PDSCH PRBs allocated to the wireless device. In another example, all the ePDCCH PRBs may not be allowed to be in the PDSCH PRBs allocated or transmitted as a PDSCH.

If the ePDCCH validation is achieved, the wireless device can consider the received DCI information accordingly as a valid semi-persistent activation or release. If the ePDCCH validation is not achieved, the received DCI format can be considered by the wireless device as having been received with a non-matching CRC.

Figure 8:
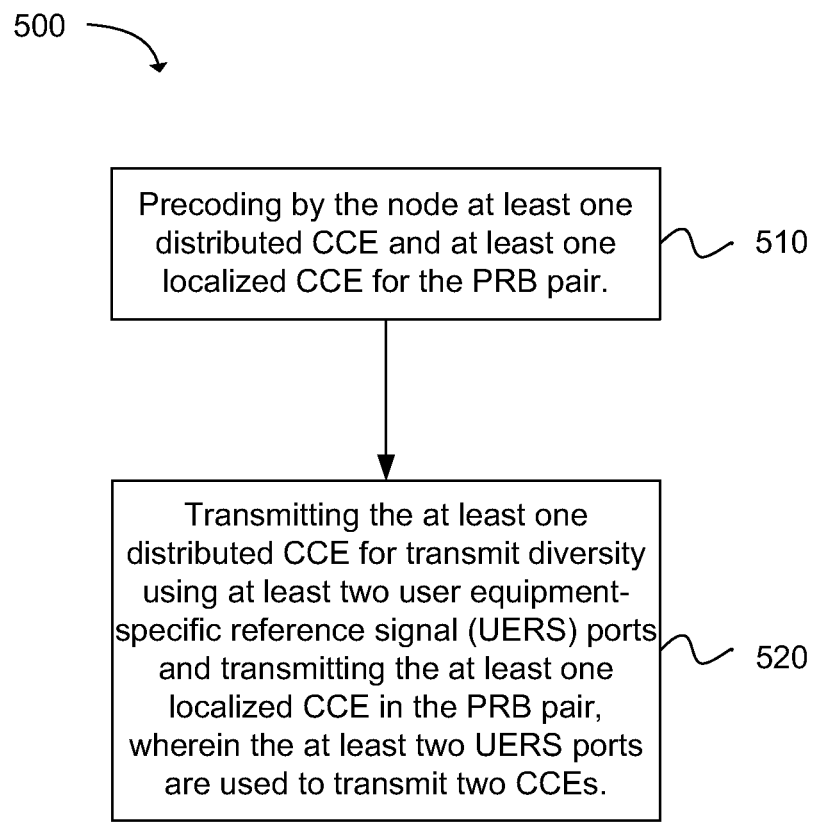
FIG. 8 depicts a flow chart of a method for transmitting a distributed control channel element (CCE) for an enhanced physical downlink control channel (ePDCCH) and a localized CCE in a physical resource block (PRB) pair from a node in accordance with an example.

Another example provides a method 500 for transmitting a distributed control channel element (CCE) for an enhanced physical downlink control channel (ePDCCH) and a localized CCE in a physical resource block (PRB) pair from a node, as shown in the flow chart in FIG. 8. The method may be executed as instructions on a machine, where the instructions are included on at least one computer readable medium. The method includes the operation of precoding by the node at least one distributed CCE and at least one localized CCE for the PRB pair, as in block 510. The operation of transmitting the at least one distributed CCE for transmit diversity using at least two user equipment-specific reference signal (UERS) ports and transmitting the at least one localized CCE in the PRB pair, wherein the at least two UERS ports are used to transmit two CCEs follows, as in block 520.

In an example, the PRB pair can include one distributed CCE and at least three localized CCE. A precoding vector w for beamforming can be applied to a UERS port for one of the localized CCE and a precoding vector orth(w) for transmit diversity can be applied to a UERS port for the distributed CCE. The precoding vector orth(w) can be orthogonal to the precoding vector w, and w and orth(w) can each be an $N_t \times 1$ vector, where $N_t$ indicates the number of node transmit antennas. The at least two UERS ports can transmit the localized CCE precoded with precoding vector w and the distributed CCE precoded with precoding vector orth(w).

In another example, the PRB pair can include at least two distributed CCE and at least one localized CCE. Two precoding vectors for transmit diversity can be applied to two UERS ports for the distributed CCEs. The two precoding vectors for transmit diversity can include precoding vectors w1, w2, w3, and/or w4, where each precoding vector is an $N_t \times 1$ vector, and $N_t$ indicates the number of node transmit antennas. In an example, the UERS ports can include UERS ports 7, 8, 9, and/or 10. In another example, up to sixteen different precoding vectors may be used.

Figure 9:
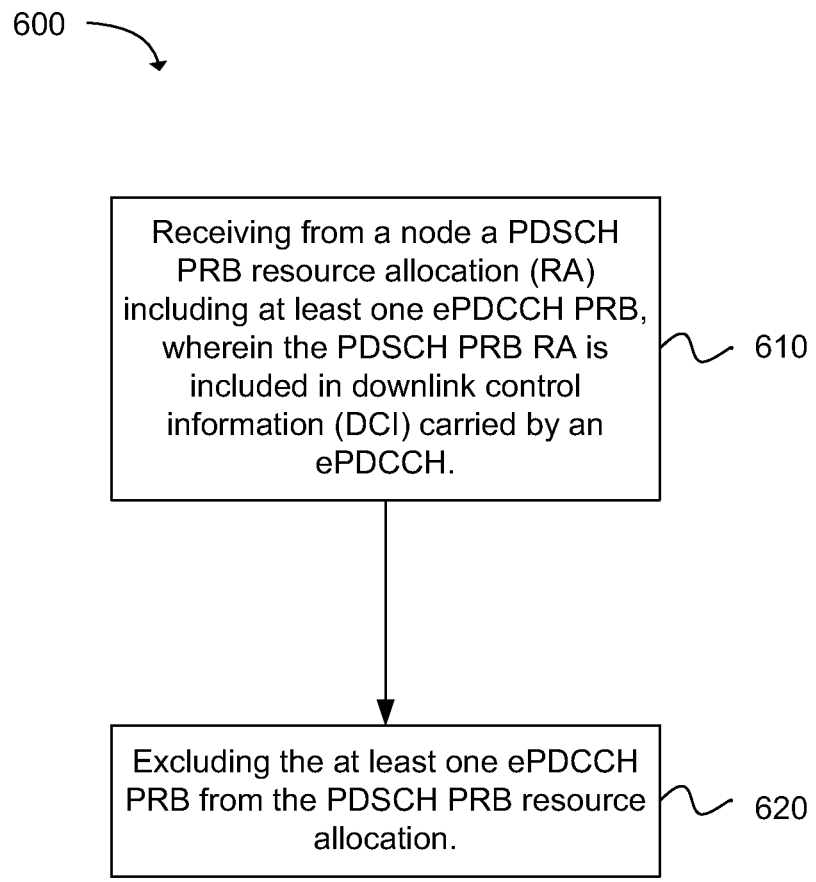
FIG. 9 depicts a flow chart of a method for physical downlink shared channel (PDSCH) physical resource block (PRB) allocation with at least one enhanced physical downlink control channel (ePDCCH) at a wireless device in accordance with an example.

Another example provides a method 600 for physical downlink shared channel (PDSCH) physical resource block (PRB) allocation with at least one enhanced physical downlink control channel (ePDCCH) at a wireless device, as shown in the flow chart in FIG. 9. The method may be executed as instructions on a machine, where the instructions are included on at least one computer readable medium or one non-transitory machine readable storage medium. The method includes the operation of receiving from a node a PDSCH PRB resource allocation (RA) including at least one ePDCCH PRB, wherein the PDSCH PRB RA is included in downlink control information (DCI) carried by an ePDCCH, as in block 610. The operation of excluding the at least one ePDCCH PRB from the PDSCH PRB resource allocation follows, as in block 620.

In an example, the at least one ePDCCH PRB can include an ePDCCH PRB for the wireless device, thus excluding the ePDCCH PRB for the wireless device from the PDSCH PRB resource allocation. In another example, the at least one ePDCCH PRB can include all ePDCCH PRB in a subframe, thus excluding all ePDCCH PRB in a subframe from the PDSCH PRB resource allocation. A resource allocation type for the resource allocation can include RA type 0 resource block group (RBG) based scheduling, RA type 1 PRB based scheduling using virtual resource blocks (VRBs), and RA type 2 contiguous PRB based scheduling using VRBs.

The method can further include the wireless device decoding the ePDCCH with virtual cyclic redundancy check (CRC) parity bits scrambled with a semi-persistent scheduling (SPS) cell radio network temporary identifier (C-RNTI) and an indicator field set to '0'. The method can further include the wireless device receiving, from the node, PRB configuration information for ePDCCH via radio resource control (RRC) signaling prior to receiving the ePDCCH. The at least one ePDCCH PRB includes at least one of a localized ePDCCH and a distributed ePDCCH. In an example, the at least one ePDCCH PRB can includes a PRB pair. The PRB pair can be two contiguous PRBs using the same subcarriers in a subframe.

Figure 10:
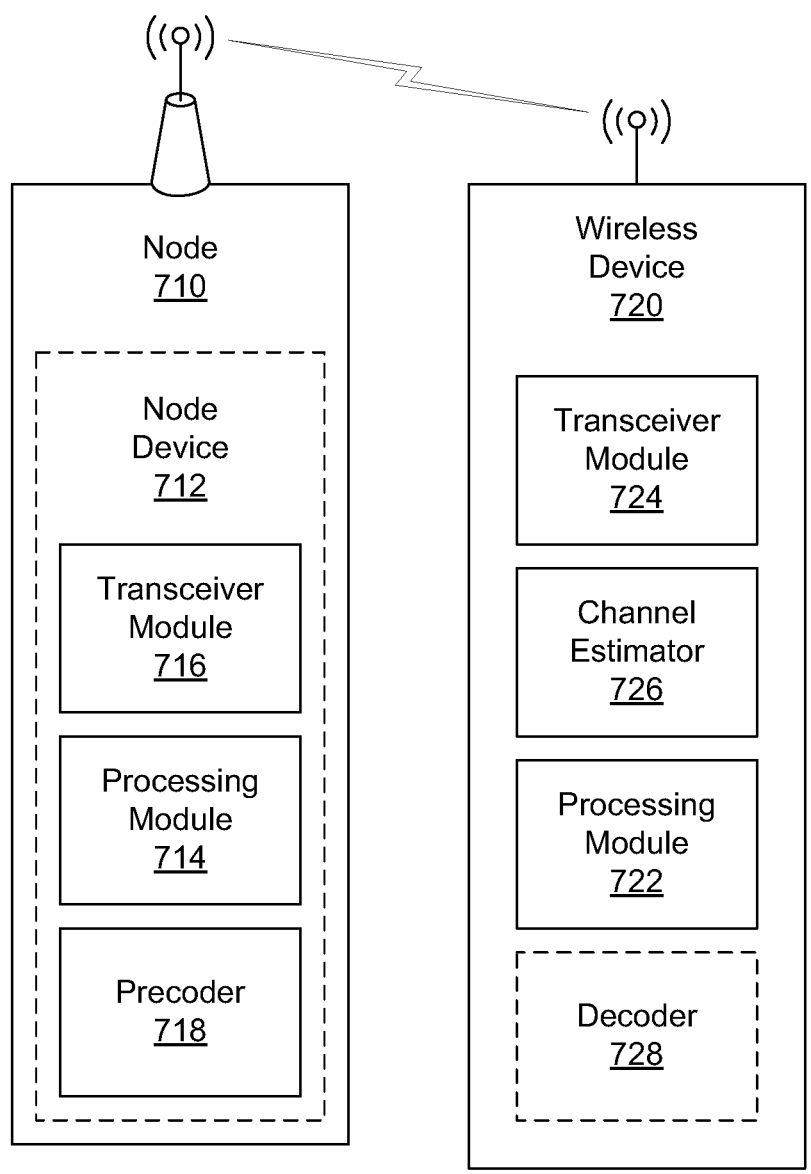
FIG. 10 illustrates a block diagram of a node and a wireless device in accordance with an example.

FIG. 10 illustrates an example node 710 and an example wireless device 720. The node can include a node device 712. The node device or the node can be configured to communicate with the wireless device. The node device can be configured for transmitting a distributed control channel element (CCE) for an enhanced physical downlink control channel (ePDCCH) and a localized CCE in a physical resource block (PRB) pair. The node device can include a transceiver module 716 and a precoder 718. The precoder can be configured to precode at least one distributed CCE and at least one localized CCE for the PRB pair. The transceiver module can be configured to transmit to the wireless device the at least one distributed CCE for transmit diversity using at least two user equipment-specific reference signal (UERS) ports and transmit the at least one localized CCE in the PRB pair. The at least two UERS ports are used to transmit two CCEs.

In an example, the PRB pair can include one distributed CCE and at least three localized CCE. A precoding vector w for beamforming can be applied to a UERS port for one of the localized CCE and a precoding vector orth(w) for transmit diversity can be applied to a UERS port for the distributed CCE. The precoding vector orth(w) can be orthogonal to the precoding vector w, and w and orth(w) can each be an $N_t \times 1$ vector, where $N_t$ indicates the number of node transmit antennas. The precoder 718 can be configured to precode the localized CCE with precoding vector w and the distributed CCE with precoding vector orth(w). The transceiver module 716 can be configured to transmit the localized CCE and the distributed CCE using at least two UERS ports.

In another example, the PRB pair can include at least two distributed CCE and at least one localized CCE. The precoder 718 can be configured to precode the at least two distributed CCEs using at least two precoding vectors for transmit diversity. The transceiver module 716 can be configured to transmit the distributed CCEs using at least two UERS ports. The at least two precoding vectors for transmit diversity can include precoding vectors w1, w2, w3, and/or w4, where each precoding vector is an $N_t \times 1$ vector, and $N_t$ indicates the number of node transmit antennas. In an example, the UERS ports can include UERS ports 7, 8, 9, and/or 10. In another example, up to sixteen different precoding vectors may be used.

In another example, the node device 712 can be configured for physical downlink shared channel (PDSCH) physical resource block (PRB) allocation with at least one enhanced physical downlink control channel (ePDCCH). The node device can include a processing module 714 and a transceiver module 716. The processing module can be configured to generate a PDSCH PRB resource allocation (RA) including at least one ePDCCH PRB. The transceiver module can be configured to transmit the PDSCH PRB RA via downlink control information (DCI) carried by an ePDCCH. In another example, the transceiver module can be configured to transmit PRB configuration information for the ePDCCH via radio resource control (RRC) signaling before transmitting the PDSCH PRB RA.

The node 710 can include a base station (BS), a Node B (NB), an evolved Node B (eNB), a baseband unit (BBU), a remote radio head (RRH), a remote radio equipment (RRE), or a remote radio unit (RRU).

The wireless device 720 can include a transceiver module 724 and a channel estimator 726. The wireless device can be configured to receive a distributed control channel element (CCE) and a localized CCE in a physical resource block (PRB) pair for at least one enhanced physical downlink control channel (ePDCCH). The transceiver module can be configured to receive at least one distributed CCE for transmit diversity and at least one localized CCE in the PRB pair. The at least two user equipment-specific reference signal (UERS) ports can be used to receive two CCEs. The channel estimator can be configured to monitor the at least two UERS ports to estimate a downlink channel.

In an example, the PRB pair can include one distributed CCE and at least three localized CCE. A precoding vector w for beamforming can be applied to a UERS port for one of the localized CCE and a precoding vector orth(w) for transmit diversity can be applied to a UERS port for the distributed CCE. The precoding vector orth(w) can be orthogonal to the precoding vector w, and w and orth(w) can each be an $N_t \times 1$ vector, where $N_t$ indicates the number of node transmit antennas.

In another example, the PRB pair can include at least two distributed CCE and at least one localized CCE. The channel estimator 726 can decode a downlink channel precoded with two precoding vector for transmit diversity applied to two UERS ports for the distributed CCEs. The two precoding vectors for transmit diversity can include precoding vectors w1, w2, w3, and/or w4, where each precoding vector is an $N_t \times 1$ vector, and $N_t$ indicates the number of node transmit antennas.

In another configuration, the wireless device 720 can include a transceiver module 724 and a processing module 722. The wireless device can be configured for enhanced physical downlink control channel (ePDCCH) validation semi-persistent scheduling (SPS) cell radio network temporary identifier (C-RNTI) masked scheduling. The transceiver module can be configured to receive downlink control information (DCI) carried by an ePDCCH having a PDSCH PRB resource allocation (RA) that include at least one ePDCCH PRB. The processing module can be configured to exclude the at least one ePDCCH PRB from the PDSCH PRB resource allocation.

In an example, the at least one ePDCCH PRB can include an ePDCCH PRB for the wireless device, thus excluding the ePDCCH PRB for the wireless device from the PDSCH PRB resource allocation. In another example, the at least one ePDCCH PRB can include all ePDCCH PRB in a subframe, thus excluding all ePDCCH PRB in a subframe from the PDSCH PRB resource allocation. A resource allocation type for the resource allocation can include RA type 0 resource block group (RBG) based scheduling, RA type 1 PRB based scheduling using virtual resource blocks (VRBs), and RA type 2 contiguous PRB based scheduling using VRBs.

In another configuration, the wireless device 720 can also include a decoder 728 configured to decode the ePDCCH with virtual cyclic redundancy check (CRC) parity bits scrambled with the SPS C-RNTI. The processing module 722 is further configured to check an indicator field for a '0' value in the ePDCCH for a valid semi-persistent activation or release. The transceiver module can be further operable to receive PRB configuration information for ePDCCH via radio resource control (RRC) signaling.

Figure 11:
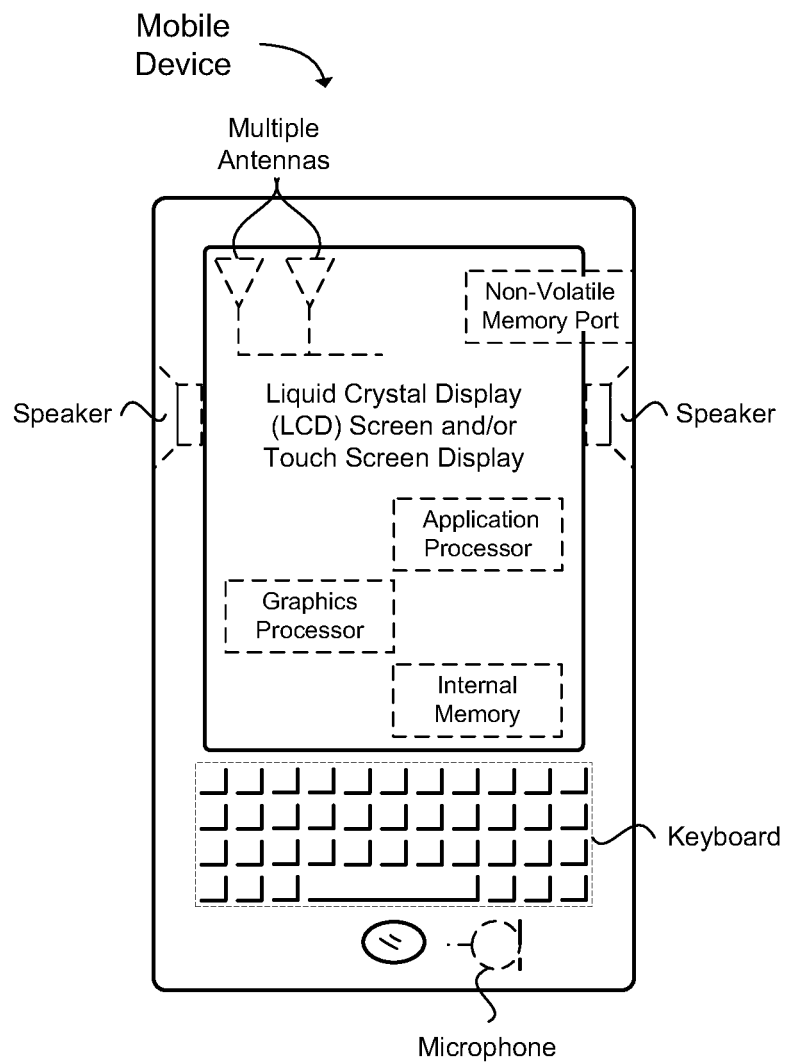
FIG. 11 illustrates a diagram of a wireless device in accordance with an example.

FIG. 11 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for transmitting a distributed control channel element (CCE) for an enhanced physical downlink control channel (ePDCCH) and a localized CCE in a physical resource block (PRB) pair from a node, comprising:
   precoding by the node at least one distributed CCE and at least one localized CCE for the PRB pair;
   transmitting the at least one distributed CCE for transmit diversity using at least two user equipment-specific reference signal (UERS) ports and transmitting the at least one localized CCE in the PRB pair, wherein the at least two UERS ports are used to transmit two CCEs; and
   applying a precoding vector w for beamforming to a UERS port for one of the localized CCE and applying a precoding vector orth(w) for transmit diversity to a UERS port for the distributed CCE, wherein orth(w) is a precoding vector that is orthogonal to w, and w and orth(w) are each an $N_t \times 1$ vector, where $N_t$ indicates the number of node transmit antennas, and the at least two UERS ports transmit the localized CCE precoded with precoding vector w and the distributed CCE precoded with precoding vector orth(w).

2. The method of claim 1 wherein the PRB pair includes one distributed CCE and at least three localized CCE.

3. The method of claim 1 wherein the PRB pair includes at least two distributed CCE and at least one localized CCE, and two precoding vectors for transmit diversity are applied to two UERS ports for the distributed CCEs.

4. The method of claim 3, wherein the two precoding vectors for spatial multiplexing are selected from the group consisting of precoding vectors w1, w2, w3, and w4, and each precoding vector is an $N_t \times 1$ vector, where $N_t$ indicates the number of node transmit antennas.

5. The method of claim 1, wherein the UERS ports are selected from the group consisting of UERS ports 7, 8, 9, and 10.

6. The method of claim 1, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

7. A wireless device configured to receive a distributed control channel element (CCE) and a localized CCE in a physical resource block (PRB) pair for at least one enhanced physical downlink control channel (ePDCCH), comprising:
   a transceiver module to receive at least one distributed CCE for transmit diversity and at least one localized CCE in the PRB pair, wherein the at least two user equipment-specific reference signal (UERS) ports are used to receive two CCEs; and
   a channel estimator configured to monitor the at least two UERS ports to estimate a downlink channel, wherein the channel estimator decodes a downlink channel precoded with a precoding vector w for beamforming applied to a UERS port for one of the localized CCE and the downlink channel precoded with a precoding vector orth(w) for transmit diversity applied to a UERS port for the distributed CCE, wherein orth(w) is a precoding vector that is orthogonal to w, and w and orth(w) are each an $N_t \times 1$ vector, where $N_t$ indicates the number of node transmit antennas.

8. The wireless device of claim 7, wherein the PRB pair includes one distributed CCE and at least three localized CCE.

9. The wireless device of claim 7, wherein the PRB pair includes at least two distributed CCE and at least one localized CCE, and the channel estimator decodes a downlink channel precoded with two precoding vector for transmit diversity applied to two UERS ports for the distributed CCEs.

10. The wireless device of claim 9, wherein the two precoding vectors for spatial multiplexing are selected from the group consisting of precoding vectors w1, w2, w3, and w4, and each precoding vector is an $N_t \times 1$ vector, where $N_t$ indicates the number of node transmit antennas.

11. The wireless device of claim 7, wherein the wireless device is selected from the group consisting of a user equipment (UE) and a mobile station (MS), and the wireless device includes at least one of an antenna, a touch sensitive display screen, a speaker, a microphone, a graphics processor, an application processor, internal memory, a non-volatile memory port, and combinations thereof.

12. At least one non-transitory machine readable storage medium comprising a plurality of instructions adapted to be executed to implement a method to receive a distributed control channel element (CCE) and a localized CCE in a physical resource block (PRB) pair for at least one enhanced physical downlink control channel (ePDCCH), comprising:
receiving at a transceiver module at least one distributed CCE for transmit diversity and at least one localized CCE in the PRB pair, wherein the at least two user equipment-specific reference signal (UERS) ports are used to receive two CCEs; and
monitoring with a channel estimator the at least two UERS ports to estimate a downlink channel, wherein the channel estimator decodes a downlink channel precoded with a precoding vector w for beamforming applied to a UERS port for one of the localized CCE and the downlink channel precoded with a precoding vector orth(w) for transmit diversity applied to a UERS port for the distributed CCE, wherein orth(w) is a precoding vector that is orthogonal to w, and w and orth(w) are each an $N_t \times 1$ vector, where $N_t$ indicates the number of node transmit antennas.

13. The at least one non-transitory machine readable storage medium of claim 12, wherein the PRB pair includes one distributed CCE and at least three localized CCE.

14. The at least one non-transitory machine readable storage medium of claim 12, wherein the PRB pair includes at least two distributed CCE and at least one localized CCE, and the channel estimator decodes a downlink channel precoded with two precoding vector for transmit diversity applied to two UERS ports for the distributed CCEs.

15. The at least one non-transitory machine readable storage medium of claim 14, wherein the two precoding vectors for spatial multiplexing are selected from the group consisting of precoding vectors w1, w2, w3, and w4, and each precoding vector is an $N_t \times 1$ vector, where $N_t$ indicates the number of node transmit antennas.

16. At least one non-transitory machine readable storage medium comprising a plurality of instructions adapted to be executed to implement a method for transmitting a distributed control channel element (CCE) for an enhanced physical downlink control channel (ePDCCH) and a localized CCE in a physical resource block (PRB) pair from a node, comprising:
precoding by the node at least one distributed CCE and at least one localized CCE for the PRB pair;
transmitting the at least one distributed CCE for transmit diversity using at least two user equipment-specific reference signal (UERS) ports and transmitting the at least one localized CCE in the PRB pair, wherein the at least two UERS ports are used to transmit two CCEs; and
applying a precoding vector w for beamforming to a UERS port for one of the localized CCE and applying a precoding vector orth(w) for transmit diversity to a UERS port for the distributed CCE, wherein orth(w) is a precoding vector that is orthogonal to w, and w and orth(w) are each an $N_t \times 1$ vector, where $N_t$ indicates the number of node transmit antennas, and the at least two UERS ports transmit the localized CCE precoded with precoding vector w and the distributed CCE precoded with precoding vector orth(w).

17. The at least one non-transitory machine readable medium of claim 16 wherein the PRB pair includes one distributed CCE and at least three localized CCE.

18. The at least one non-transitory machine readable medium of claim 16 wherein the PRB pair includes at least two distributed CCE and at least one localized CCE, and two precoding vectors for transmit diversity are applied to two UERS ports for the distributed CCEs.

19. The at least one non-transitory machine readable medium of claim 16, wherein the two precoding vectors for spatial multiplexing are selected from the group consisting of precoding vectors w1, w2, w3, and w4, and each precoding vector is an $N_t \times 1$ vector, where $N_t$ indicates the number of node transmit antennas.

20. The at least one non-transitory machine readable medium of claim 16, wherein the UERS ports are selected from the group consisting of UERS ports 7, 8, 9, and 10.

21. The at least one non-transitory machine readable medium of claim 16, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and combinations thereof.

* * * * *